Sept. 18, 1962 R. T. DIVERS ETAL 3,054,844
FLUID-STOP JOINT BETWEEN ELECTRICAL CONDUCTORS
Filed Oct. 8, 1959
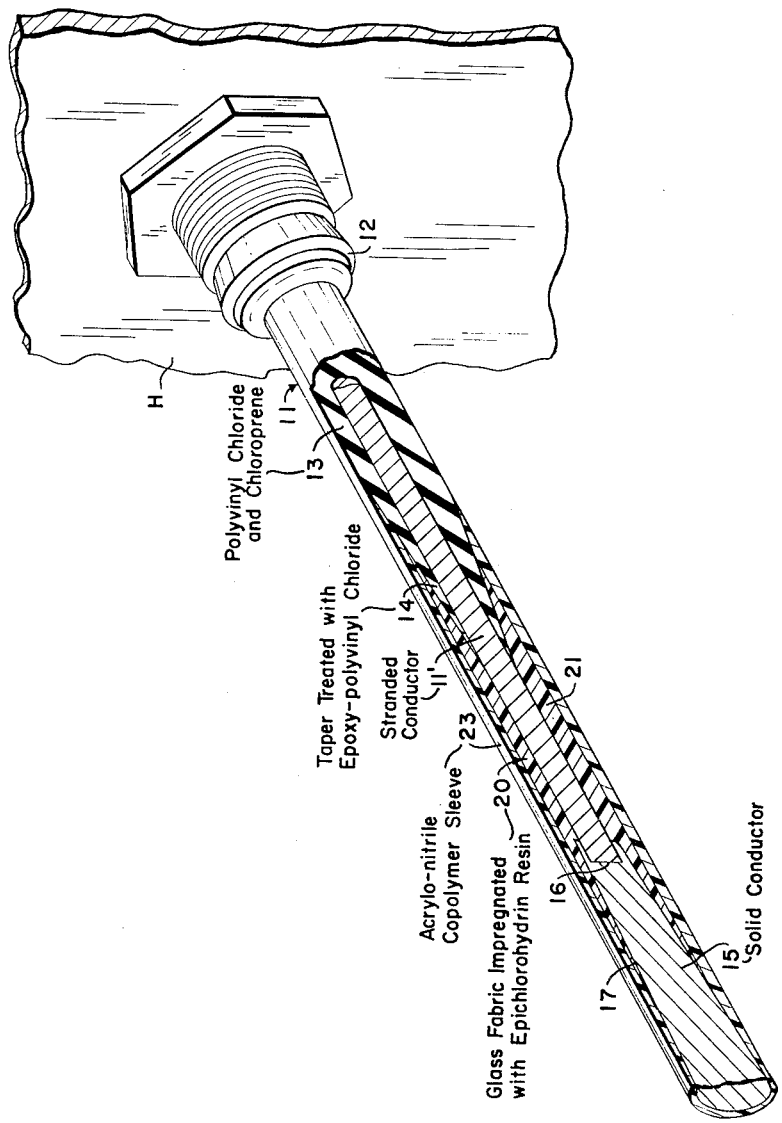
INVENTORS
RAYMOND T. DIVERS
PAUL J. LYNCH
BY
ATTORNEY.

United States Patent Office 3,054,844
Patented Sept. 18, 1962

3,054,844
FLUID-STOP JOINT BETWEEN ELECTRICAL CONDUCTORS
Raymond T. Divers, Camillus, and Paul J. Lynch, East Syracuse, N.Y., assignors to Carrier Corporation, Syracuse, N.Y., a corporation of Delaware
Filed Oct. 8, 1959, Ser. No. 845,113
3 Claims. (Cl. 174—22)

This invention relates to electrical connections, more particularly, to means for connecting a high voltage conductor extending through a relatively sealed housing to a current supply conductor externally of said housing.

A variety of situations exist in which it is necessary to provide means for effecting an efficient connection between a plurality of insulated high voltage electrical conductors. The conventionally employed high voltage conductor may be designated so as to prevent current leakages from the conductor through the insulation; when it becomes necessary to join another insulated conductor to the aforementioned insulated conductor, it is found that current leakages occur at the point of juncture or splicing of said conductors which flow along the surface of the insulation. Where these junctures or splices are located adjacent a ground, the high voltage current tends to leak from the conductor to the ground through said splice. Thus, where high voltage equipment must be connected to necessary current supplies, some means must be provided to effect this connection without permitting the passage of current from the point of connection to the ground.

Attempts have been made to mitigate the difficulties arising from current leakage from the splice between two high voltage conductors, and a ground, by employing splice insulation which has dielectric properties such as to prevent current leakage. However, even where the splice insulation has the requisite dielectric properties, current leakage occurs between the interface of the splice insulation and the conductor insulation. To prevent this leakage the path between the insulator interface and ground must be of a length precluding the passage of current from the conductor to the ground. With high voltage motors, any connection between the motor windings and the current supply sources must be effected in a manner precluding the passage of current from the leads or conductors to the generally grounded motor housing. The space for effecting an adequate connection between conductors generally results in the production of a bulky, material, and space consuming motor housing.

Where the motor is employed in connection with a hermetically sealed unit, such for example as a sealed refrigerant compressor, additional problems are encountered in that the fluid under pressure within the sealed housing tends to flow along the conductor strands or between the surface of the conductor and the insulating covering in the unit of the solid conductor being used. In connection with the specific problems involved in refrigerant compressors, it is clearly necessary to provide means preventing the loss of refrigerant from the compressor housing.

It is with the above problems in mind, that the present means have been evolved, means permitting effective electrical connection between two electrical conductors, one of said conductors extending through a fluid medium under a relatively high pressure. The novel connection between the conductors permits the use of relatively simple seals about the point in the housing for said fluid medium, where the conductor extends therefrom, and serves effectively to prevent the loss of said fluid medium along the conductor from the housing. As a result of this external connecting means, the space requirement of any equipment to which the conductors are connected is kept at a minimum.

It is accordingly a primary object of this invention to provide improved connecting means for joining two electrical conductors.

An additional object of the invention is to provide a connector for electrical conductors which substantially eliminates the possibility of current flow between the surface boundaries of the insulation surrounding said conductors.

Another object of the invention is to permit the making of electrical connections between a conductor in a housing and one externally of the housing without requiring the use of a terminal lead through block.

An additional object of the invention is to provide a connector between an electrical conductor extending from a fluid medium under relatively high pressure to a conductor in a relatively low pressure environment in a manner such as to prevent the loss of fluid from said high pressure medium.

A further object of the invention is to provide a novel electrical connector for joining electrical conductors, with said connector being simple in manufacture and use.

It is also an object of this invention to provide a cable conductor leak block for use in conjunction with a compressor shell which may be located externally of the compressor housing permitting use of a relatively small compressor housing, and additionally implementing repair or replacement of the leak block.

These and other objects of the invention which will be made hereinafter are more apparent are achieved by provision of an insulating layer extending between a solid conductor secured to the end of the stranded conductor of the equipment lead and the insulation surrounding said stranded conductor. Secured over the insulating layer extending from the insulation normally surrounding the stranded conductor over the solid conductor is an insulating sleeve. By employing the novel arrangement, the travel of any fluid along the stranded conductor is blocked by the solid conductor, and the arrangement of the insulating layer and the insulating sleeve serve to prevent the passage of current from the point of juncture of the stranded conductor and the solid conductor to ground.

The specific structural details of a preferred embodiment of the invention, and the mode of attaining same will be made most manifest and particularly pointed out in clear, concise and exact terms in conjunction with the accompanying drawing wherein the figure represents a perspective view with parts broken away of a lead extending from a hermetically sealed housing containing a fluid under pressure, showing how this lead is arranged for conjunction to an external power source.

Referring now more particularly to the drawing, the lead 11 is shown extending through compression fitting 12 arranged in a suitable fashion with respect to housing H containing a hermetically sealed enclosure.

Lead 11 comprises a conventional stranded conductor 11' surrounded by conventional high voltage insulation 13 which is formed of continuous extrusion cross-compounded polyvinyl chloride and chloroprene or the like. The end of lead 11 is formed so that stranded conductor 11' is exposed and a tapered end 14 is formed on insulation 13.

A solid conductor 15 in the form of a copper bar is formed with a recess 16 at one end of a size sufficient to accommodate stranded conductor 11'. The dimensions of solid conductor 15 are preferably equal to or less than the cross sectional dimensions of lead 11, but the cross sectional area of the solid conductor should be such as to permit covering of the exposed end of stranded conductor 11', and a taper 17 is formed on the end of solid conductor 15 adjacent recess 16. The other end of solid conductor 15 functions as a terminal piece which may either be removably connected to an external power source by means of suitable cable connectors, or may be joined to a stranded cable in a fashion similar to the juncture at the other end.

An insulating layer 20 is formed to extend over the exposed stranded conductor 11' between the lead insulation 13 and the solid conductor 15. This insulating layer 20 comprises an impregnated porous insulating sheet material 21 arranged preferably in a plurality of layers, each layer being impregnated with an insulating filler agent. In the preferred embodiment of the invention, the porous insulating material may be impregnated with a thixotropic resin such as epichlorohydrin resin. In order to insure a bond between the insulating layer 20, and the lead insulation 13, the surface of the insulation taper 14 is treated, preferably, with a cross-compounding agent such as epoxy-polyvinyl chloride.

After a sufficient build-up of the insulating layer 20 has been attained, an insulating sleeve 23 is positioned over the lead insulation 13, the insulating layer 20, and whatever portion of the solid conductor 15 it is desired to insulate. This insulating sleeve 23 is preferably formed of an acrylonitrile copolymer.

The aforedisclosed structural arrangement may be attained in a variety of fashions. However, in practice, with particular reference to effecting power connections to high voltage motors encased in hermetically sealed housings H such as are utilized in connection with the motor compressor units of refrigeration systems, the lead 11 is extended from housing H, utilizing a standard compression fitting 12 at the point of egress of lead 11 from housing H. After extending the lead for a suitable distance to permit desired manipulation, and to insure that subsequent connections to the lead will not produce arcing from the point of connection to the grounded housing, the aforedisclosed connection may be effected.

This is accomplished by stripping lead insulation 13 from stranded conductor 11' to expose an end of the conductor and to provide insulation taper 14 as viewed in the drawing. It will be noted that the process of removing insulation to form a taper serves the twofold function of permitting insulation removal without the need of the exertion of an axial cutting force against the lead, thereby minimizing the danger of cutting into the stranded conductor; and further serves to increase the surface area of lead insulation available for bonding to insulating layer 20.

Solid conductor 15 is then connected to exposed stranded conductor 11' to cover the exposed ends thereof.

Where conventional high voltage leads are employed, the lead insulation 13 as noted will be formed of an impermeable extruded solid of which the cross-compounded polyvinyl chlorides and chloroprene have been found eminently suitable. The surface of taper 14 is coated with a cross-compounding agent. Insulating layer 20 is formed by wrapping the exposed stranded lead conductor 11' and the taper 14, and the tapered portion 17 of solid conductor 15 with a porous insulating sheet material such as a glass fabric impregnated with epichlorohydrin resin. Insulating layer 20 is built up of several sheets of porous insulating material filled with the thixotropic resin until the desired thickness has been attained. Preferably, the porous insulating sheet material is wrapped and then impregnated with the filling agent; a second layer is then placed about the first layer after the impregnating step to expel any bubbles from the filling agent.

Then an insulating sleeve 23 is arranged over the insulating layer 20 extending between lead insulation 13, and the solid conductor 15.

Thereafter the solid conductor may be suitably connected to a power supply either by means of a suitable cable connection, or by some other splicing technique.

As a result of the aforedescribed technique, the occurrence of any fluid leakage along stranded conductor 11' from hermetically sealed housing H will be prevented by virtue of the fact that the fluid travelling along the stranded conductor 11' will be blocked at solid conductor 15 which covers the ends thereof. In view of the substantially continuous insulation provided by the insulating layer 20 bonded to lead insulation 13, the possibility of current leakage from the point of connection of stranded conductor 11' and solid conductor 15 to ground is eliminated.

It is thus seen that an efficient simple means has been provided for effecting connection of current splice to high voltage motor leads extending from a fluid containing hermetically sealed housing.

The above disclosure has been given by way of illustration and elucidation, and not by way of limitation, and it is desired to protect all embodiments of the herein disclosed inventive concept within the scope of the appended claims.

We claim:
1. A method for blocking fluid flow along an insulated stranded electrical conductor extending from a relatively high pressure medium to an area of relatively lower pressure, said method comprising the steps of: removing the insulation from the end of the conductor to expose same; forming a taper along the surface of the conductor insulation to the exposed conductor; joining the exposed stranded conductor to a solid conductor; coating the taper with a cross-compounding agent; wrapping the exposed conductor with a porous insulating sheet material which extends over the taper and at least part of the solid conductors; impregnating the insulating sheet material with a filling agent; and extending an insulating sleeve over the filled insulating material, whereby a unitary structure is formed.

2. Means for connecting an electrical lead formed of an insulated first conductor extending from a relatively high pressure medium to a second conductor in an area of relatively low pressure, said first conductor being insulated with cross-compounded polyvinyl chloride and chloroprene, said means comprising solid conducting means formed with a recess within which the ends of the first conductor are received to cover the same, said solid conducting means being electrically connected to the first conductor; a taper formed on said solid conducting means adjacent the recess; a taper formed on the insulation of the first conductor, porous insulating glass fabric layers extending between and over said tapers; insulating filler means selected from the class of thixotropic epichlorohydrin resins impregnating said porous means and impervious insulating sleeve means extending over said impregnated porous insulating means, said sleeve means being formed of a material selected from the class of acrylonitrile copolymers.

3. A method for blocking fluid flow along an insulated stranded electrical conductor extending from a relatively high pressure medium to an area of relatively lower pressure, said method comprising the steps of: removing the insulation from the end of the conductor to expose same; electrically connecting a solid conductor to the end of the exposed stranded conductor to cover same; wrapping the exposed conductor with a porous insulating sheet material which extends over part of the stranded conductor insulation and the solid conductor; impregnating the porous insulating material with a filling agent; wrapping a second layer of porous insulating sheet material over the first mentioned wrapping after said impregnating step to expel any bubbles from the filling agent and covering the filler impregnated porous insulating material with an impervious insulating sleeve.

(References on following page)

References Cited in the file of this patent

UNITED STATES PATENTS

| | | |
|---|---|---|
| 2,626,223 | Sattler et al. | Jan. 20, 1953 |
| 2,791,622 | Nicholas | May 7, 1957 |
| 2,956,613 | Edelman et al. | Oct. 18, 1960 |
| 2,967,795 | Bollmeier et al. | Jan. 10, 1961 |

FOREIGN PATENTS

| | | |
|---|---|---|
| 132,334 | Austria | Mar. 10, 1933 |
| 531,767 | Great Britain | Jan. 10, 1941 |
| 587,580 | Great Britain | Apr. 30, 1947 |
| 773,969 | Great Britain | May 1, 1957 |
| 1,180,185 | France | Dec. 29, 1958 |

UNITED STATES PATENT OFFICE
CERTIFICATE OF CORRECTION

Patent No. 3,054,844 September 18, 1962

Raymond T. Divers et al.

It is hereby certified that error appears in the above numbered patent requiring correction and that the said Letters Patent should read as corrected below.

Column 1, line 18, for "designated" read -- designed --; column 2, line 32, strike out "are", first occurrence; line 36, after "layer" insert -- and --.

Signed and sealed this 3rd day of September 1963.

(SEAL)
Attest:

ERNEST W. SWIDER
Attesting Officer

DAVID L. LADD
Commissioner of Patents